(12) United States Patent
Agrawal et al.

(10) Patent No.: US 7,782,784 B2
(45) Date of Patent: Aug. 24, 2010

(54) PORT ANALYZER ADAPTER

(75) Inventors: Pawan Agrawal, San Jose, CA (US);
Sujatha Sundaraaraman, Milpitas, CA (US); Ritu Aggarwal, Santa Clara, CA (US); Silvano Gai, San Jose, CA (US); Dinesh Ganapathy Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1483 days.

(21) Appl. No.: 10/409,427

(22) Filed: Apr. 7, 2003

(65) Prior Publication Data

US 2004/0153854 A1    Aug. 5, 2004

Related U.S. Application Data

(60) Provisional application No. 60/439,582, filed on Jan. 10, 2003.

(51) Int. Cl.
*H04J 1/16* (2006.01)
(52) U.S. Cl. ..................... 370/236.2; 370/474
(58) Field of Classification Search ................. 370/466, 370/464, 472, 474, 476, 229, 230, 252, 351, 370/392, 389, 470, 217, 222, 221, 236.2, 370/238, 216, 250, 254, 241, 242, 245, 477, 370/498, 906, 386; 709/230, 231, 236, 232, 709/203, 218, 223, 224; 714/712, 39, 4, 714/6, 43, 701, 702, 724; 707/1, 100, 101; 715/736
See application file for complete search history.

(56) References Cited

U.S. PATENT DOCUMENTS 5,481,735 A * 1/1996 Mortensen et al. .......... 709/246

5,515,376 A    5/1996 Murthy et al.

(Continued)

FOREIGN PATENT DOCUMENTS

WO    WO 0178308 A2    10/2001

(Continued)

OTHER PUBLICATIONS

First Office Action issued Feb. 9, 2007, for Chinese Patent Application No. 200380108620.7, filed Dec. 18, 2003, *Port Adapter Network-Analyzer*. in Chinese (7 pp.) and in English translation (7 pp.).

(Continued)

*Primary Examiner*—Aung S Moe
*Assistant Examiner*—Abdullah Riyami
(74) *Attorney, Agent, or Firm*—Weaver Austin Villeneuve & Sampson LLP

(57) ABSTRACT

Methods and devices are provided for encapsulating FC frames from a network device as Ethernet frames. Preferably, the FC frames represent traffic for a plurality of ports of the network device. The encapsulated Ethernet frames may be input to a conventional network interface card of a personal computer ("PC") or laptop. Therefore, encapsulating the FC frames allows an engineer to use software installed on a conventional PC to troubleshoot problems with a network using FC protocol. According to some aspects of the invention, FC frames may be truncated to various degrees, to allow smaller data frames to be output at an appropriate rate to the analyzing personal computer, laptop, etc.

57 Claims, 12 Drawing Sheets

U.S. PATENT DOCUMENTS

| | | | |
|---|---|---|---|
| 5,610,905 A | | 3/1997 | Murthy et al. |
| 5,742,604 A | | 4/1998 | Edsall et al. |
| 5,790,554 A | | 8/1998 | Pitcher et al. |
| 5,920,705 A | * | 7/1999 | Lyon et al. .................. 709/240 |
| 6,268,808 B1 | * | 7/2001 | Iryami et al. .................. 341/51 |
| 6,272,180 B1 | * | 8/2001 | Lei ....................... 375/240.16 |
| 6,282,678 B1 | * | 8/2001 | Snay et al. .................. 714/712 |
| 6,324,669 B1 | * | 11/2001 | Westby ....................... 714/805 |
| 6,377,571 B1 | * | 4/2002 | Tai ............................. 370/355 |
| 6,499,107 B1 | | 12/2002 | Gleichauf et al. ........... 713/201 |
| 6,553,036 B1 | | 4/2003 | Miller et al. |
| 6,650,641 B1 | | 11/2003 | Albert et al. |
| 6,704,883 B1 | | 3/2004 | Zhang et al. .................. 714/4 |
| 6,748,431 B1 | | 6/2004 | Feig et al. |
| 6,888,800 B1 | | 5/2005 | Johnson et al. |
| 6,892,287 B1 | * | 5/2005 | Millard et al. .............. 711/158 |
| 6,904,061 B2 | | 6/2005 | Schmitt et al. |
| 6,954,437 B1 | | 10/2005 | Sylvest et al. |
| 6,959,007 B1 | * | 10/2005 | Vogel et al. ................. 370/469 |
| 7,007,208 B1 | * | 2/2006 | Hibbert et al. .............. 714/712 |
| 7,020,715 B2 | * | 3/2006 | Venkataraman et al. ..... 709/236 |
| 7,107,328 B1 | | 9/2006 | Muthiyan et al. |
| 7,124,198 B2 | * | 10/2006 | Pinkerton .................. 709/236 |
| 7,164,657 B2 | | 1/2007 | Phaal |
| 7,206,863 B1 | | 4/2007 | Oliveira et al. |
| 7,292,567 B2 | | 11/2007 | Terrell et al. |
| 7,299,277 B1 | * | 11/2007 | Moran et al. ................. 709/224 |
| 7,310,447 B2 | * | 12/2007 | Yano et al. .................. 382/236 |
| 7,339,929 B2 | | 3/2008 | Zelig et al. |
| 7,417,978 B1 | | 8/2008 | Chou et al. |
| 7,447,197 B2 | | 11/2008 | Terrell et al. |
| 7,474,666 B2 | | 1/2009 | Kloth et al. |
| 7,496,043 B1 | * | 2/2009 | Leong et al. ................. 370/241 |
| 7,536,470 B2 | * | 5/2009 | Li et al. ....................... 709/231 |
| 2001/0055274 A1 | | 12/2001 | Hegge et al. |
| 2002/0042866 A1 | * | 4/2002 | Grant et al. .................. 711/162 |
| 2002/0046289 A1 | | 4/2002 | Venkaraman et al. |
| 2002/0116564 A1 | * | 8/2002 | Paul et al. .................... 710/301 |
| 2002/0136223 A1 | | 9/2002 | Ho |
| 2002/0143849 A1 | | 10/2002 | Newell et al. |
| 2002/0156924 A1 | * | 10/2002 | Czeiger et al. .............. 709/249 |
| 2002/0170004 A1 | | 11/2002 | Parrett et al. .................. 714/43 |
| 2002/0186697 A1 | * | 12/2002 | Thakkar ....................... 370/401 |
| 2002/0191649 A1 | * | 12/2002 | Woodring .................... 370/906 |
| 2003/0026251 A1 | * | 2/2003 | Morris et al. ............... 370/389 |
| 2003/0028634 A1 | | 2/2003 | Oshizawa |
| 2003/0040897 A1 | | 2/2003 | Murphy et al. |
| 2003/0043755 A1 | * | 3/2003 | Mitchell ...................... 370/252 |
| 2003/0053464 A1 | | 3/2003 | Chen et al. |
| 2003/0076779 A1 | * | 4/2003 | Frank et al. .................. 370/229 |
| 2003/0084319 A1 | | 5/2003 | Tarquini et al. |
| 2003/0091037 A1 | * | 5/2003 | Latif et al. .................. 370/355 |
| 2003/0118053 A1 | | 6/2003 | Edsall et al. |
| 2003/0131182 A1 | | 7/2003 | Kumar et al. |
| 2003/0137937 A1 | | 7/2003 | Tsukishima et al. |
| 2003/0152028 A1 | | 8/2003 | Raisanen et al. |
| 2003/0202536 A1 | * | 10/2003 | Foster et al. ................. 370/469 |
| 2003/0214913 A1 | | 11/2003 | Kan et al. |
| 2003/0227874 A1 | * | 12/2003 | Wang ......................... 370/236 |
| 2004/0034492 A1 | | 2/2004 | Conway |
| 2004/0054758 A1 | * | 3/2004 | Chang et al. ................. 709/219 |
| 2004/0085994 A1 | | 5/2004 | Warren et al. |
| 2004/0086027 A1 | * | 5/2004 | Shattil ........................ 375/146 |
| 2004/0146063 A1 | * | 7/2004 | Golshan et al. ............. 370/428 |
| 2004/0153863 A1 | * | 8/2004 | Klotz et al. ................... 714/45 |
| 2005/0053073 A1 | | 3/2005 | Kloth et al. |
| 2005/0114710 A1 | * | 5/2005 | Cornell et al. .............. 713/201 |
| 2005/0232269 A1 | * | 10/2005 | Yao et al. .................... 370/389 |
| 2005/0232285 A1 | | 10/2005 | Terrell et al. |
| 2006/0056455 A1 | * | 3/2006 | Ruiz Floriach et al. ...... 370/469 |
| 2006/0062254 A1 | * | 3/2006 | Markevitch et al. ......... 370/474 |
| 2006/0168321 A1 | | 7/2006 | Eisenberg et al. |
| 2006/0274656 A1 | * | 12/2006 | Paul et al. .................... 370/231 |
| 2007/0171914 A1 | * | 7/2007 | Kadambi et al. ......... 370/395.2 |
| 2007/0208821 A1 | * | 9/2007 | Pittman ....................... 709/213 |
| 2007/0258457 A1 | | 11/2007 | Sakamoto et al. |
| 2009/0046593 A1 | * | 2/2009 | Ptasinski et al. ............. 370/252 |
| 2009/0103566 A1 | | 4/2009 | Kloth et al. |

FOREIGN PATENT DOCUMENTS

WO      WO 02082728 A1    10/2002

OTHER PUBLICATIONS

US Office Action mailed May 15, 2007, from U.S. Appl. No. 10/655,452. 9 pp.
EP Examiner's Communication pursuant to Article 96(2) EPC dated Sep. 18, 2006, from related European Application No. 04781826.5, 11 pages.
Walker, David S., et al., U.S. Appl. No. 10/346,050, "Method and Apparatus for Remotely Monitoring Network Traffic Through A Generic Network", filed Jan. 15, 2003.
PCT Invitation to Pay Additional Fees, with a Partial International Search Report, mailed Dec. 3, 2004, from related International Application No. PCT/US2004/027217.
International Search Report dated Feb. 7, 2005, from related International Application No. PCT/US2004/027217.
Written Opinion of the International Searching Authority, dated Feb. 7, 2005, from related International Application No. PCT/US2004/027217.
M. Rajagopal, et al., "Fibre Channel Over TCP/IP (FCIP)", IETF, Aug. 2002, pp. 1-68.
U.S. Office Action dated Apr. 17, 2008 U.S. Appl. No. 10/346,050 (Palermo).
U.S. Office Action dated Nov. 27, 2007 U.S. Appl. No. 10/346,050 (Palermo).
U.S. Office Action dated Feb. 8, 2007 U.S. Appl. No. 10/346,050 (Palermo).
International Search Report dated Jul. 2, 2005 from related International Application No. PCT/US2004/027217.
Written Opinion of the International Searching Authority dated Jul. 2, 2005 from related International Application No. PCT/US2004/027217.
http://en.wikipedia.org/wiki/IP_protocol.
http://en.wikipedia.org/wiki/Network_layer.
http://en.wikipedia.org/wiki/Generic_Routing_Encapsulation.
http://en.wikipedia.org/wiki/MPLS.
http://en.wikipedia.org/wiki/IPv4#Fragmentation.
U.S. Office Action dated Mar. 5, 2008 from U.S. Appl. No. 10/655,452, 14 pgs.
U.S. Office Action dated Jul. 21, 2008 from U.S. Appl. No. 11/114,257.
Office Action dated Sep. 3, 2008 for U.S. Appl. No. 10/346,050. (Palermo).
First Office Action dated May 23, 2008 from Chinese Patent Application No. 200480020541.5 7 pgs.
Australian Office Action dated Jul. 18, 2008 for AU Patent Application No. 2003301218.
Notice of Allowance dated Sep. 19, 2008 from U.S. Appl. No. 10/655,452.
Allowed Claims for U.S. Appl. No. 10/655,452.
U.S. Appl. No. 11/114,257, Sharma, et al., filed Apr. 25, 2005.
International Search Report, dated Jun. 17, 2004, from International Application No. PCT/US 03/40911, including Notification of Transmittal.
Examiner's Communication pursuant to Article 96(2) EPC dated Jul. 26, 2007, from European Patent Application No. 03815236.9, Port Adapter Network-Analyzer, (4 pp.).
Second Chinese Office Action, issued Aug. 24, 2007, for Chinese Patent Application No. 200380108620.7, filed Dec. 18, 2003, Port Adapter Network-Analyzer, in English (8 pp.) and in Chinese (7 pp.).
US Office Action mailed Oct. 4, 2007, from U.S. Appl. No. 10/655,452, (14 pp.).

Examiner's Communication pursuant to Article 96(2) EPC dated Nov. 9, 2007, from European Patent Application No. 04781826.5, Switch Port Analyzers, (5 pp.).

Canadian Office Action dated Feb. 3, 2009 from Application No. 2,512,338, 2 pgs.

U.S. Office Action dated May 14, 2009 from U.S. Appl. No. 11/114,257; 21 pgs.

CN Second Office Action dated Nov. 27, 2009 from Chinese Patent Appl. No. 200480020541.5.

US Office Action dated Mar. 16, 2009 for US Patent, from related U.S. Appl. No. 10/346,050 [Palermo].

US Final Office Action dated Nov. 24, 2009, from related U.S. Appl. No. 11/114,257.

US Office Action dated Oct. 5, 2009, from related U.S. Appl. No. 10/346,050 [Palermo].

US Office Action dated Jan. 27, 2010, from related U.S. Appl. No. 10/346,050 [Palermo].

* cited by examiner

| Switch 4 | Switch 3 | Switch 2 | Switch 1 | Fibre Channel mode | Truncate mode |
|---|---|---|---|---|---|
| ON | ON | ON | ON | 1Gbps | MNM |
| ON | ON | OFF | OFF | 1Gbps | DTM |
| ON | OFF | ON | OFF | 1Gbps | STM |
| ON | OFF | OFF | ON | 1Gbps | ETM |
| ON | OFF | OFF | OFF | 1Gbps | NTM |
| OFF | ON | ON | OFF | 2Gbps | DTM |
| OFF | OFF | OFF | OFF | 2Gbps | STM |
| OFF | OFF | OFF | ON | 2Gbps | ETM |
| OFF | OFF | OFF | OFF | 2Gbps | NTM |

FIG. 5

PORT ANALYZER ADAPTER

RELATED APPLICATION

This application claims priority to U.S. Provisional Application No. 60/439,582, filed Jan. 10, 2003, which is hereby incorporated by reference for all purposes.

BACKGROUND OF THE INVENTION

1. Field of the Invention

This invention relates generally to network management and specifically relates to troubleshooting network devices that use the Fibre Channel ("FC") protocol.

2. Description of Related Art

Network devices occasionally malfunction. Such malfunctions can result in the network devices going down, in congestion of traffic on the network and in other negative effects. When such malfunctions occur, network managers need to analyze traffic on one or more network devices in order to troubleshoot the problem. Moreover, network traffic should be analyzed in other situations, such as during a system upgrade, when bringing up a network, for monitoring a network, etc.

FC protocol is increasingly used for storage area networks and similar networks. One such device used as a fabric network device for storage area networks is a Multi-layer Data Switch ("MDS"), manufactured by Cisco Systems, Inc. Data ingress and egress the MDS in FC protocol via FC ports. Accordingly, when a network manager needs to troubleshoot a problem with a network device that is using FC protocol, the device used by the network manager must be able to capture and analyze frames in FC protocol. (The terms "frame" and "packet" are equivalent as used herein.)

Currently, devices known as FC analyzers are available for capturing and analyzing data from an FC port. An FC analyzer is configured to receive FC frames from a network device and to allow an engineer, network administrator, etc., to view and analyze the FC frames. By analyzing the FC frames and determining the types of errors associated with the FC frames, it is normally possible to deduce the underlying problems with the network. However, FC analyzers are rather expensive. Therefore, it would be desirable to have a less expensive device for the analysis of FC frames.

SUMMARY OF THE INVENTION

Methods and devices are provided for encapsulating FC frames from a network device as Ethernet frames. Preferably, the FC frames represent traffic for a plurality of ports of the network device. The encapsulated Ethernet frames may be input to a conventional network interface card of a personal computer ("PC") or laptop. Therefore, encapsulating the FC frames allows an engineer to use software installed on a conventional PC to troubleshoot problems with a network using FC protocol.

According to some aspects of the invention, FC frames may be truncated to various degrees, to allow smaller data frames to be output at an appropriate rate to the analyzing personal computer, laptop, etc. Preferred embodiments of the invention are used in conjunction with the switched port analyzer ("SPAN") or remote SPAN ("RSPAN") features, which allow the convenient monitoring of network traffic through a Fibre Channel interface. SPAN mode operation allows traffic through any Fibre Channel interface of a network device to be replicated and delivered to a single port on the same network device. RSPAN allows the delivery of the replicated traffic to a port on a remote network device.

According to some aspects of the invention, a method for facilitating the analysis of a network device is provided. The method includes the following steps: receiving Fibre Channel frames from a first port of the network device; encapsulating the Fibre Channel frames as Ethernet frames; and outputting the Ethernet frames.

The method may also include the step of configuring the port for switched port analyzer mode, wherein the first port outputs Fibre Channel frames replicating traffic of at least a second port of the network device. The encapsulating step can include encapsulating an entire Fibre Channel frame or only a portion of a Fibre Channel frame. The method may also include the step of adding data to a Fibre Channel frame.

The method may also include the step of converting the Fibre Channel frame from a light signal to an electrical signal. The method may also include the step of regulating a speed at which the Fibre Channel frames are input and/or the step of regulating a speed at which the Ethernet frames are output.

According to alternative aspects of the invention, another method for facilitating the analysis of a network device is provided. The method includes the following steps: receiving Fibre Channel frames from a first port of the network device, the Fibre Channel frames including traffic from at least one other port of the network device; encapsulating the Fibre Channel frames as Ethernet frames; and outputting the Ethernet frames.

The method may include the step of configuring the port for switched port analyzer mode, wherein the port outputs Fibre Channel frames replicating traffic of all other ports of the network device. The encapsulating step may include encapsulating an entire Fibre Channel frame or only a portion of a Fibre Channel frame. The method can also include the step of adding data to a Fibre Channel frame.

The method may include the step of converting the Fibre Channel frame from a light signal to an electrical signal. The method may also include the step of regulating a speed at which the Fibre Channel frames are input and/or regulating a speed at which the Ethernet frames are output.

According to some embodiments of the invention, an apparatus is provided for facilitating the analysis of a network device. The apparatus includes the following components: a first port for receiving Fibre Channel frames from the network device; at least one processor for encapsulating the Fibre Channel frames as Ethernet frames; and a second port for outputting the Ethernet frames. In some such embodiments, one or more of the processors can encapsulate an entire Fibre Channel frame or only a portion of a Fibre Channel frame.

The apparatus may include a converter for converting the Fibre Channel frame from a light signal to an electrical signal. The apparatus can also include a first regulator for regulating a speed at which the Fibre Channel frames are input and/or a second regulator for regulating a speed at which the Ethernet frames are output. The apparatus may also be able to determine an appropriate speed at which the Ethernet frames should be output to another device.

According to other embodiments of the invention, a computer program embodied in a machine-readable medium is provided for facilitating the analysis of a network device. The computer program includes instructions for controlling an apparatus to perform the following steps: receiving Fibre Channel frames from a first port of the network device; encapsulating the Fibre Channel frames as Ethernet frames; and outputting the Ethernet frames.

These and other features of the invention will be described below with respect to the following drawings.

BRIEF DESCRIPTION OF THE DRAWINGS

FIG. 5 is a table that indicates dip switch settings and modes of operation of a device according to one embodiment of the present invention.

DETAILED DESCRIPTION OF THE INVENTION

Figure 1:
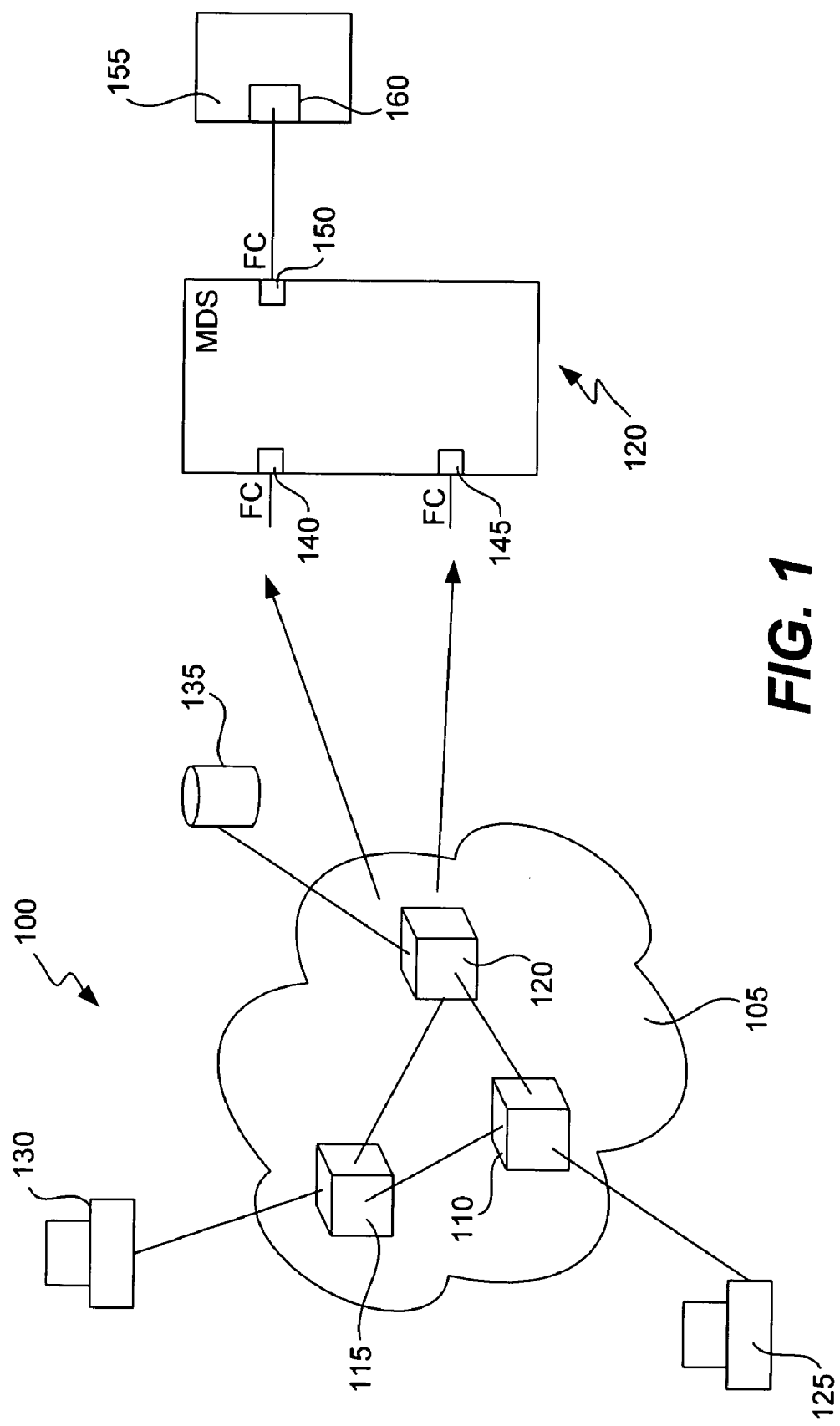
FIG. 1 is a network diagram that depicts a prior art method of analyzing a network device.

FIG. 1 depicts a prior art method of analyzing and troubleshooting a network device. Network 100 includes fabric 105, which includes network devices 110, 115 and 120. Network devices 110, 115 and 120 may be any type of network device known in the art that may be used to form a fabric of a Fibre Channel network. Nodes 125 and 130 represent personal computers or similar devices with which users may interact with fabric 105, for example to access data within storage device 135.

An expanded view of network device 120 depicts Fibre Channel ports 140, 145 and 150. In this example, network device 120 is an MDS device manufactured by Cisco Systems, Inc., as described above.

Conventional Fibre Channel analyzer 155 receives Fibre Channel frames from port 150 of network device 120. FC analyzer 155 includes Fibre Channel host bus adapter ("HBA"), which is an expensive component. Accordingly, the overall expense of FC analyzer 155 is significant.

Figure 2:
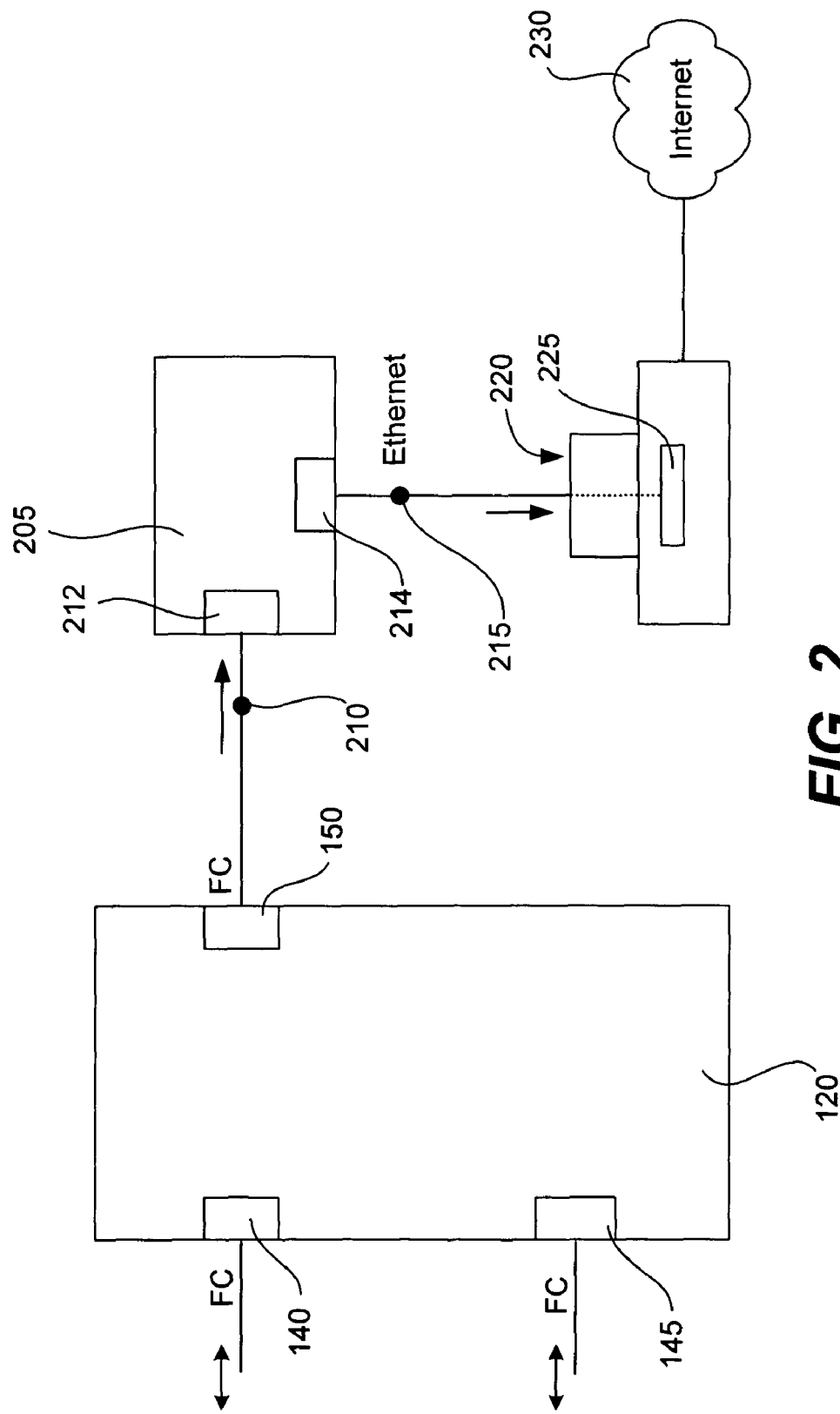
FIG. 2 is a block diagram that depicts an apparatus according to one embodiment of the present invention.

FIG. 2 depicts an apparatus for analyzing Fibre Channel frames according to some embodiments of the present invention. In FIG. 2, ports 140 and 145 of network device 120 are configured to receive Fibre Channel frames from and send Fibre Channel frames to other network devices in fabric 105. However, in this embodiment, port 150 has been configured for switched port analyzer ("SPAN") mode, a proprietary mode developed by Cisco Systems, Inc.

When a port is configured to operate in SPAN mode, packets are output from the port (egress), but the port cannot receive any frames. Moreover, the port is typically not flow-controlled. In addition, no FC link needs to be established with an external device that receives frames from a port configured to operate in SPAN mode. Instead, data is output as if placed on the wire and no handshaking is performed Accordingly, some embodiments of device 205 do not have an FC media access control ("MAC"). However, alternative embodiments of device 205 have a MAC and may be used, for example, when port 150 is not operating in SPAN mode.

Device 205 receives FC frames 210 from network device 120 via FC port 212. SPAN copies traffic from one or more source ports in a VSAN or from one or more VSANs to a destination port for analysis. Therefore, although device 205 receives FC frames 210 from port 150, SPAN mode operation allows these frames to be transferred from ports 140 and/or 145. In other words, when port 150 is operating in SPAN mode, copies of FC frames involving some or all traffic on device 120, including traffic on ports 140 and/or 145, may be received by device 205.

Alternative embodiments of the invention involve the configuration of device 120 for RSPAN operation, thereby allowing device 205 to remotely monitor traffic on one or more switches across a network.

Among other things, device 205 encapsulates FC frames 210 and outputs encapsulated Ethernet frames 215, via Ethernet port 214, to analyzing device 220. Device 220 may be an ordinary personal computer, laptop, etc., that includes Ethernet HBA card 225. Then, frames 215 may be analyzed by device 220, for example by software downloaded from Internet 230. Such software includes, but is not limited to, the Ethereal network analyzer, an "open source" software released under GNU license agreement.

Figure 2A:
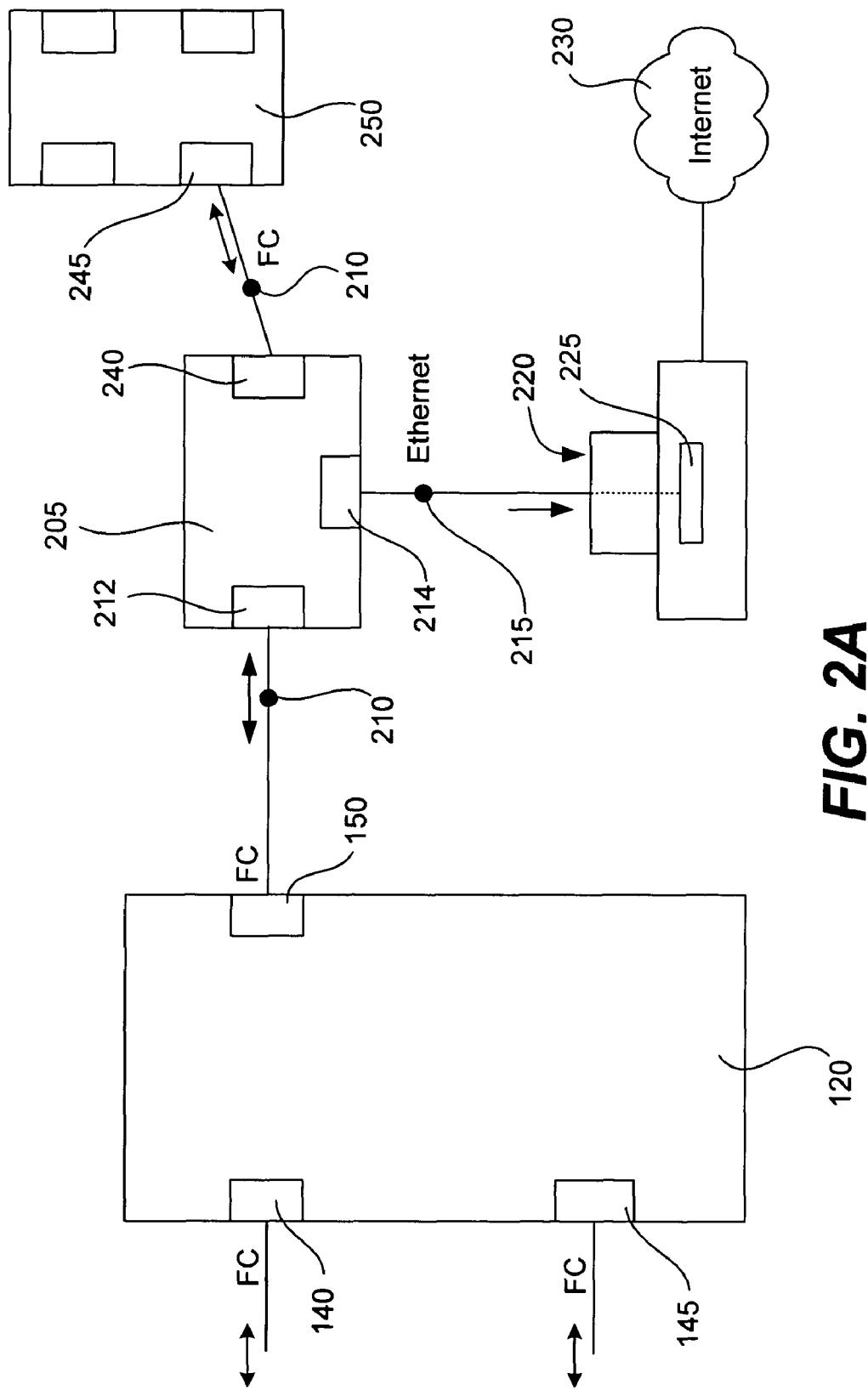
FIG. 2A is a block diagram that depicts an apparatus according to another embodiment of the present invention.

FIG. 2A depicts an embodiment of device 205 used without the need for configuring port 150 for SPAN or RSPAN operation. In this embodiment, device 205 includes FC ports 212 and 240, which allow traffic between network devices 120 and 250 to be passed through device 205. FC frames 210 that are received by either of FC ports 212 or 240 are encapsulated and output as Ethernet frames 215, via Ethernet port 214, to analyzing device 220.

Figure 3:
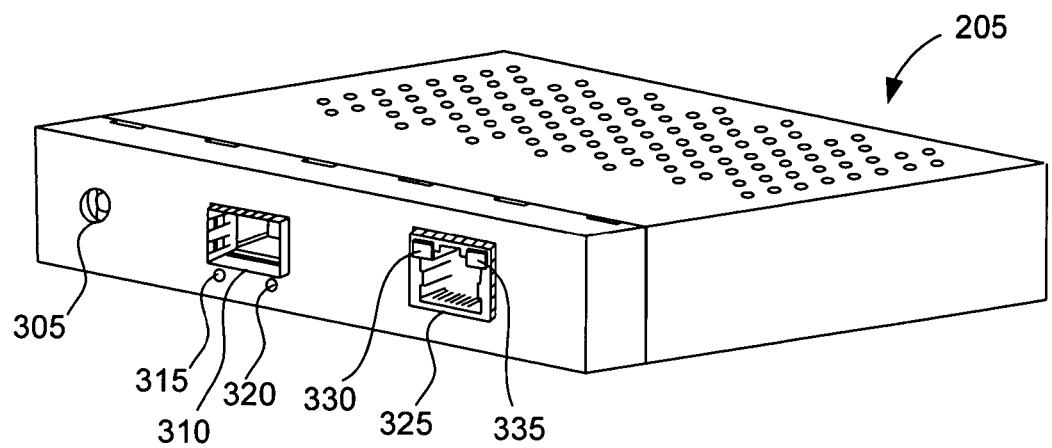
FIG. 3 is a front view of an apparatus according to one embodiment of the present invention.
Figure 4:
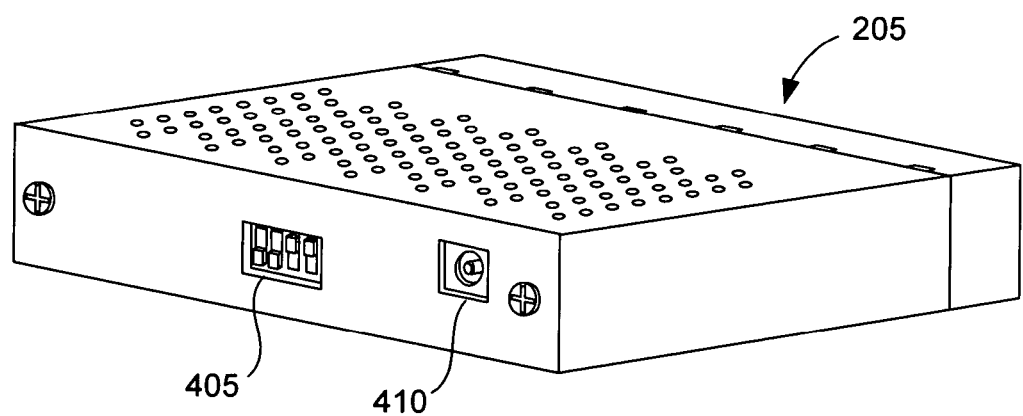
FIG. 4 is a rear view of an apparatus according to one embodiment of the present invention.

FIGS. 3 and 4 depict device 205 according to one embodiment of the invention. One of skill in the art will appreciate that the layout and components of device 205 could substantially differ, while still remaining within the spirit and scope of the invention. For example, the indicators of device 205 use light-emitting diodes ("LEDs") in this embodiment, but could be formed using any type of light, switch, dial, knob or other indicator known in the art.

FIG. 3 is a perspective diagram that illustrates the front of device 205. This embodiment of device 205 includes status indicator 305, which indicates whether the power is on or off. Fibre Channel port 310 is used to receive FC frames 210 from network device 120. Link indicator 315 indicates whether the FC link is up or down. FC speed indicator 320 indicates the data flow from network device 120. For example, indicator 320 may indicate whether the FC link is operating in 1 Gbps mode or 2-Gbps mode.

Ethernet port 325 is used to output Ethernet frames 215 to analyzing device 220. Indicator 330 is on when the 100 Mbps Ethernet link is up and blinks when Ethernet frames are being transmitted on the Ethernet link. Indicator 335 is on when the 1 Gbps Ethernet link is up and blinks when frames are being transmitted on this link.

FIG. 4 is a perspective diagram that illustrates the rear of device 205 according to one embodiment. Dip switches 405 may be used to configure device 205 in various ways, as will be described below with reference to FIG. 5. Input 410 may be used as a power input port, e.g., a 12-volt direct current power input port.

FIG. 5 is a table that indicates dip switch settings for switch 405 and modes of operation for device 205. It will be apparent to those of skill in the art that other devices and configurations could be used for setting the modes of operation and otherwise configuring device 205. For example, the modes of operation described below (for example, modes defining the amount of truncation, if any) are purely examples of numerous possible modes of operation and in no way limit the scope of the present invention.

Moreover, some alternative embodiments of device 205 can receive a predefined control frame from the FC side or the Ethernet side. The control frame contains information about a new desired mode and/or configuration. According to some such embodiments, a control frame is identified by a designated field, e.g., in the header of a frame. Preferably, the control frame includes authentication information. Upon receiving the control frame, the device 205 will change its mode from an old mode and/or configuration to a new mode and/or configuration specified by the control frame.

According to some embodiments of the invention, the control frame is one type of FC frame 210 received by device 205 via port 150. Device 205 identifies this frame as a control frame and accordingly does not forward the control frame to device 220. Instead, device 205 reads the other fields of the control frame to obtain mode and/or configuration information indicated by the control frame, to be used in processing subsequently-received frames.

According to various embodiments, the control frame may contain some or all of the following information: 1) an IP address so that a subsequently-received frame can be routed to the Internet; 2) frame filtering information that indicates device 205 should filter out (drop) certain frames (e.g., frames coming from one or more source addresses); 3) port filtering information, which controls device 205 to filter out frames based on their associated ports; 4) a destination address for device 205 to include in subsequent packets; 5) truncate mode information, which controls device 205 to switch to a truncate mode, which may be as described below with reference to FIGS. 8-11 or alternative truncate modes; 6) start and stop information, which indicates that device 205 should either start or stop sending frames to the Ethernet side based on this information; and 7) "Hello" packet information, which indicates that device 205 will generate a "Hello" packet and send it to the Ethernet side periodically, to inform device 220 that device 205 is functioning.

In yet other embodiments, dip switch 405 has additional switches to accommodate other Fibre Channel modes, truncate modes or other configurations of device 205.

As shown, setting 505 indicates a Fibre Channel mode of 1 Gbps and also indicates that device 205 will operate in management mode. According to some aspects of the invention, device 206 transmits an Ethernet frame of a fixed size when in management mode that contains internal debugging information. When in management, device 205 will not accept Fibre Channel frames. The information contained in the Ethernet frame transmitted during management mode pertains to the internal workings of device 205. Management mode will be described in further detail with reference to FIG. 11.

Setting 510 indicates a Fibre Channel mode of 1 Gbps and also indicates that device 205 will operate in deep truncate mode ("DTM"). In DTM, device 205 causes the most severe truncation of Fibre Channel frames. In some aspects of the invention, device 205 truncates an FC frame by reducing the frame size to a maximum of (64 bytes). Deep truncate mode operation will be described in further detail with reference to FIG. 10.

Setting 515 indicates that the Fibre Channel mode will be operating at a speed of 1 Gbps and that device 205 will operate in shallow truncate mode ("STM"). In STM, the FC frame is truncated if the size of the FC frame is more than 256 bytes. Shallow truncate mode of operation will be described in further detail with reference to FIG. 9.

Setting 520 indicates that the Fibre Channel mode will have a speed of 1 Gbps and that device 205 will operate in Ethernet truncate mode ("ETM"). Because the maximum size for Ethernet frame 215 is typically 1520 bytes, including a 24 byte overhead, the FC frame 210 is truncated at 1496 bytes.

Setting 525 indicates a Fibre Channel mode setting of 1 Gbps and a truncate mode of NTM, which means "non-truncate mode." In NTM, FC frame 210 is passed without any modification to its payload. Accordingly, device 220 must be capable of supporting jumbo Ethernet frames 215 for NTM operation to work appropriately.

Setting 530 indicates a Fibre Channel mode of 2 Gbps and a deep truncate mode of operation. Setting 535 indicate a Fibre Channel mode of 2 Gbps and a shallow truncate mode of operation. Setting 540 indicates a 2 Gbps rate of Fibre Channel mode operation and that device 205 will operate in Ethernet truncate mode. Setting 545 indicates a Fibre Channel mode of 2 Gbps and a truncate mode of NTM.

Figure 6:
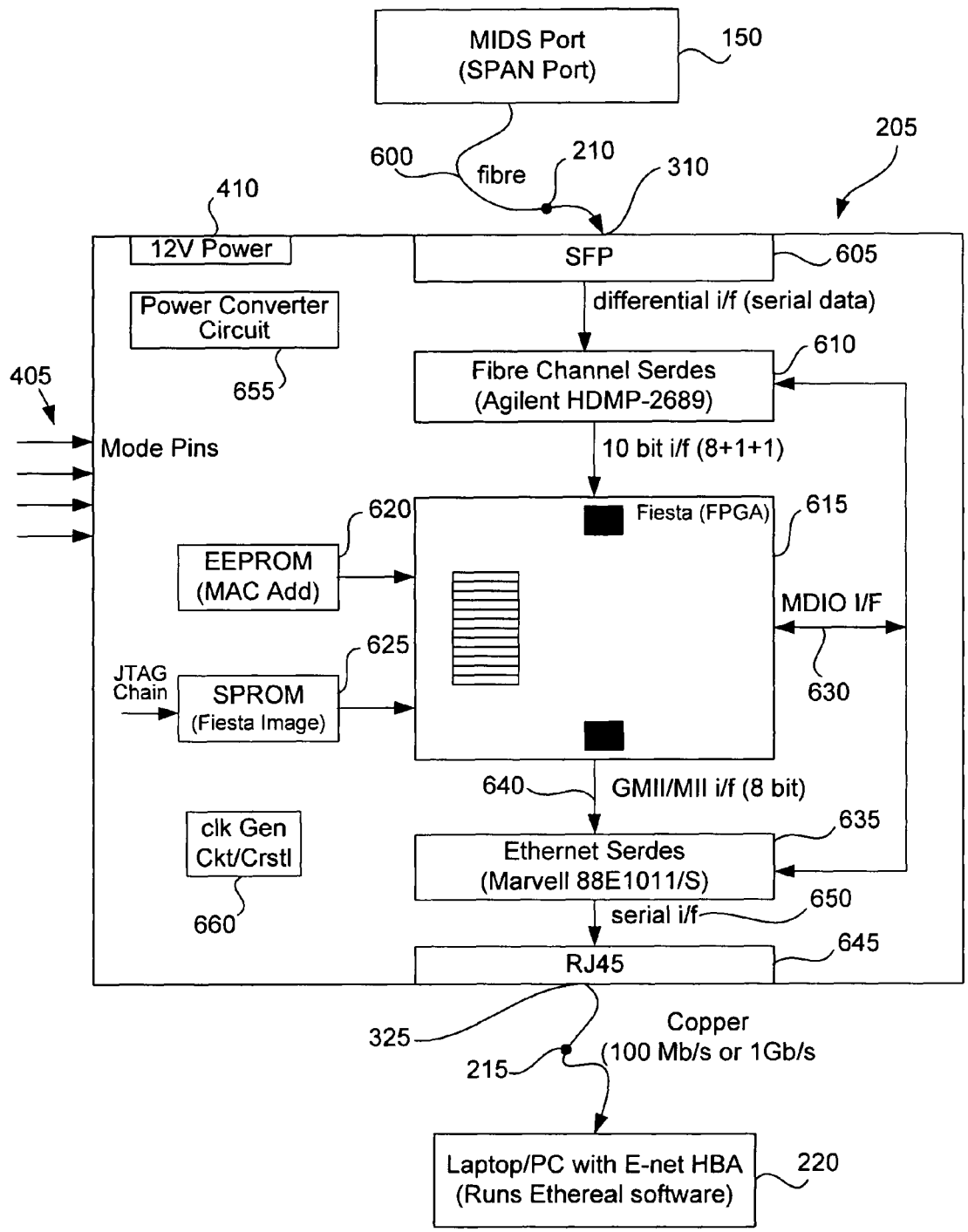
FIG. 6 is a block diagram that depicts the internal components of a device according to one embodiment of the present invention.

FIG. 6 is a block diagram that indicates the components of device 205. One of skill in the art will appreciate that in alternative embodiments, some of the components illustrated in FIG. 6 can be merged or separated, eliminated, etc. The components shown in FIG. 6 define a particular architecture, which may be different according to other aspects and embodiments of the invention. In this example, port 150 sends FC frames 210 across fiber 600 to port 310. Converter 605 converts the optical signal of FC frames 210 and converts them into electrical pulses. Such devices typically contain special lasers that generate an electrical pulse when light is shined on them. Converter 605 may be, for example, an Agilent HFBR-5720L converter.

Interface 610 de-serializes incoming data from converter 605, performs decoding, if necessary (such as 8 bit/10 bit decoding) and provides data (e.g., 8 bit data) to processor 615. According to one embodiment, processor 615 is field programmable gate array ("FPGA") processor, but any suitable processor may be used. For example, other embodiments of the invention use one or more application-specific integrated circuits ("ASICs"), programmable logic devices ("PLDs") such as electrically programmable logic devices ("EPLDs"), microprocessors, etc., instead of an FPGA processor.

Processor 615 provides frame parsing and encapsulation of Fibre Channel frames 210. Processor 615 will be described in detail with reference to FIG. 12. Processor 615 may be, for example, a programmable part from the Xilinx Virtex II family FPGA processors, such as the XC2V1000-5 or the XC2V500-4. Among other things, Processor 615 provides management interface 630 to elements 610 and 635.

In this embodiment, device 205 includes a serial EEPROM chip 620 for storing the source MAC address and other information. Chip 620 may be, for example, an Atmel AT93C46 chip. Preferably, chip 620 is byte-addressable. In some such embodiments, chip 620 has a total of 512 addresses. If, for example, data are transmitted between chip 620 and FPGA chip 615 in 2-byte increments, chip 620 may be organized into 256 16-bit addresses.

In this embodiment, device 625 includes a serial PROM chip for storing the program image that is loaded into the device 615 at the time of power-up. Device 625 may be, for example, from the Xilinx XC18V00 ISP family PROMs, such as XC18V04. This device provides serial-load and parallel-load configuration modes and is compatible with all Xilinx FPGAs.

Device 615 sends FC frames encapsulated within an Ethernet payload to the device 635 on the interface 640. Interface 640 is an industry standard interface—Media Independent Interface (MII) or Gigabit Media Independent Interface (GMII) used for 100 Mbps and 1 Gbps Ethernet respectively.

In this embodiment, device 635 is an integrated Gigabit Ethernet Transceiver, which is a physical layer device for 100/1000 Ethernet. Device 635 may be, for example, the Marvell 88E1011S Integrated 10/100/1000 Gigabit Ethernet Transceiver. Device 635 sends Ethernet frames to the device 645 on the interface 650.

Interface 650 is also an industry standard interface—Media Dependent Interface (MDI). Device 645 is used to send the Ethernet frames received on the MDI to the physical interface.

In this embodiment, this physical interface may be CAT 5 UTP (Category 5 Unshielded Twisted Pair) copper cables. Device 645 may be, for example, an RJ45 device which can convert MDI signalling to the appropriate physical interface signalling. It will be apparent to those of skill in the art that other devices could be used for the above stated operation, such as SFP (Small Form Pluggable) and optical fibre instead of RJ45 and copper cable.

In this embodiment, 12-volt power is supplied from an outside source through input 410. Power converter circuit 655 includes a voltage regulator for distributing power to the various components of device 205.

Clock 660 generates time signals for controlling various components. In one embodiment, clock 660 generates a 25 MHz signal and sends it to Processor 615. In some embodiments, clock 660 sends a 106.25 MHz signal to element 610. Those of skill in the art will appreciate that these clock speeds are merely exemplary and that any convenient clock speed(s) may be used.

Ethernet port 325 outputs Ethernet frames 215 to analyzing device 220. As noted above, Ethernet frames 215 may be transmitted to analyzing device 220 at various speeds. For example, Ethernet frames 215 may be transmitted at a rate of 100 Mbps or 1 Gbps, as described above, or may be transmitted at other speeds if so desired. Preferably, device 205 will indicate the speed at which Ethernet frames 215 are being transmitted. In some embodiments, indicators 330 and 335 indicate a 100 Mbps transmission rate or a 1 Gbps transmission rate, respectively.

Figure 7:
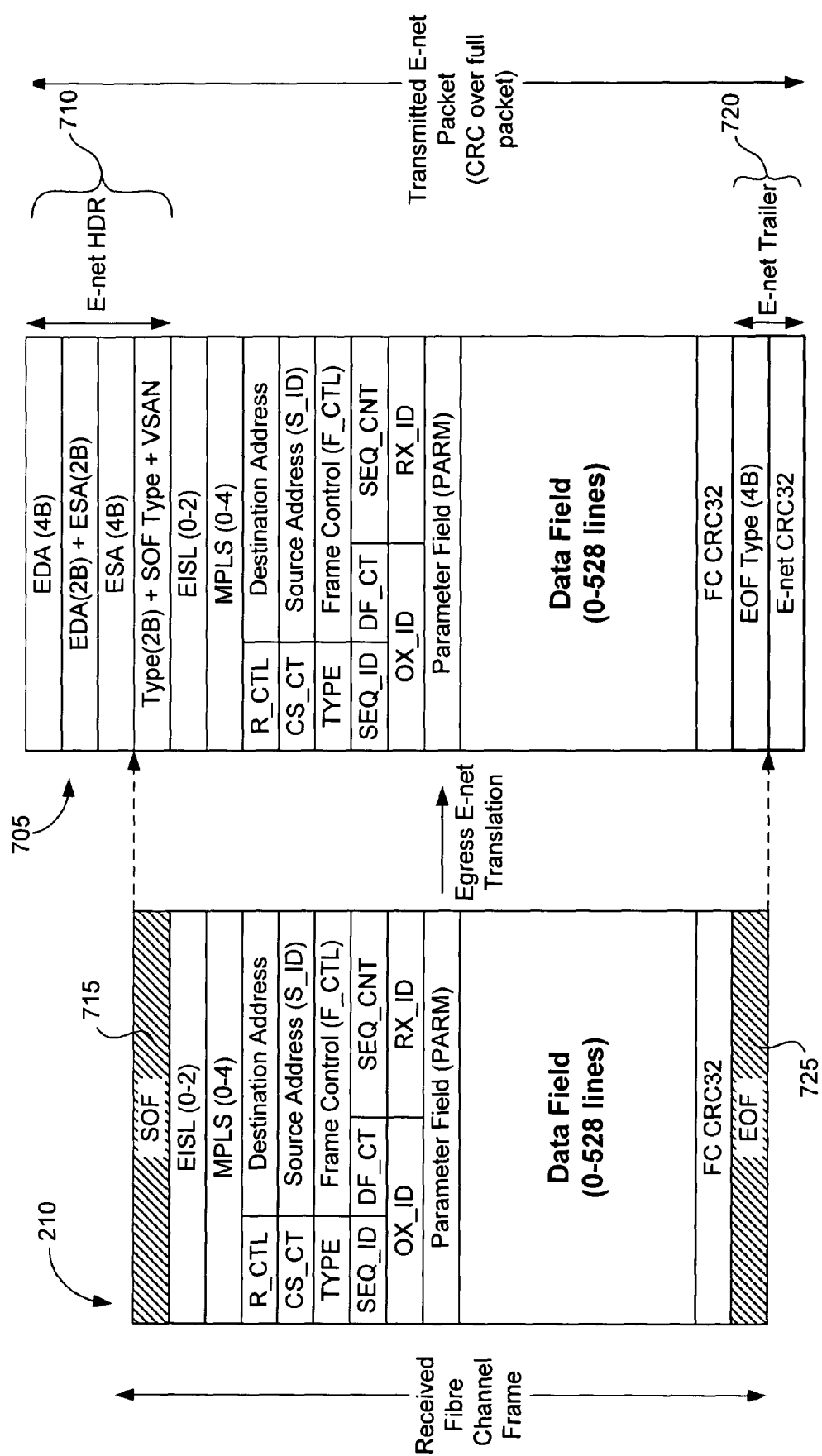
FIG. 7 indicates the input and output frames during "non-truncate mode" operation according to some aspects of the invention.

FIG. 7 depicts input FC frame 210 and output Ethernet frame 705 when device 205 is operating in NTM mode. Ethernet frame 705 is one example of Ethernet frame 215, depicted in FIG. 2. When device 205 is in NTM mode, FC frames are passed without modification to the payload, as shown in FIG. 7. When FC frame 210 is of maximum size, Ethernet frame 705 will be larger than a standard Ethernet frame. Therefore, device 220 must be able to read jumbo Ethernet frames when device 205 is operating in NTM mode.

Ethernet header 710 indicates the start of frame ("SOF") type, but the SOF data are not copied directly to the output Ethernet frame in this embodiment. Ethernet header 710 includes Ethernet destination address ("EDA"). In this embodiment, the EDA and the Ethernet source address ("ESA") are 6 byte quantities that are split into 2 lines. Here, the ESA is the MAC address of the Processor 615. In preferred embodiments, EEPROM 620 will contain the MAC address for each chip, which will be read at power-up time.

The SOF type field is a 4 bit field in this embodiment. FC protocol provides 12 different types of SOF. Accordingly, the SOF type field includes a corresponding code for each SOF type.

The VSAN field, which has 12 bits in this embodiment, indicates VSAN information from FC frame 210. In preferred embodiments, if frame 210 is detected to be of an extended interswitch link ("EISL") type, device 205 copies the VSAN field from the FC frame into this field. The description of EISL in U.S. patent application Ser. No. 10/034,160 is hereby incorporated by reference for all purposes. According to some aspects of the invention, if FC frame 210 is not in EISL format, this field contains all zeroes.

According to some aspects of the invention, all of the fields of FC frame 210, from EISL field through the FC CRC field are encapsulated and included in Ethernet frame 215 when device 205 is operating in No Truncate Mode. However, EOF field 725 of FC frame 210 is not captured, but instead its type is encoded in Ethernet trailer 720. Ethernet trailer 720 also preferably includes a CRC field.

The end of frame ("EOF") type field is a 4-byte field in this embodiment and includes EOF information, error type and packet count information. The FC protocol provides 10 different types of EOFs and accordingly the present invention has a distinct code for each EOF type. In addition, some aspects of the present invention include additional coding. For example, according to one aspect of the invention, a "no EOF type" code is provided for the situation in which there is a control character inside an FC frame. In addition, some aspects of the invention provide a code to be used in the instance where an FC frame becomes "jumbo," for example, when no EOF is detected in the FC frame.

In this example, 8 bits of the EOF type field are used for error type coding. One of skill in the art will appreciate that the field used for error type coding could have a larger or a smaller size. According to one aspect of the invention, the 8 bits correspond to the following error types: control character inside frame; jumbo FC frame; FIFO full; bad FC CRC; truncated frame; no data; and empty frame. 1 bit is reserved for another designation.

The "empty frame" bit is set when an incoming FC frame 210 contains no data. If an FC frame with an SOF and an EOF are received with no data in between, this bit will be set.

According to some aspects of the invention, the "no data" bit is set when the FC frame contains only 24 bytes of data (or less) between SOF and EOF. The "truncated frame" bit is set when the mode is ETM, STM or DTM and the FC frame is bigger than the allowed maximum. In this instance, the FC frame will be truncated and the "truncated frame" bit will be set.

If FC frame 210 includes a bad CRC, the "bad FC CRC" bit will be set. Preferably, even when the frame is truncated (e.g., in ETM, STM, or DTM mode), the FC CRC is checked and the "bad" FC CRC is set, if applicable.

Device 205 includes at least one buffer for incoming FC frames 210. When this buffer is full, the "FIFO full" bit is set. This condition should not occur when the FC and Ethernet sides are running at the same speed. However, when the Fibre Channel is running at a higher speed, a "FIFO full" condition may occur. Preferably, before storing FC frame 210, device 205 determines whether there is enough memory available to store FC frame 210. FC frame 210 is dropped if the buffer does not have enough space. However, if an EOF is lost, the FC frame 210 could become larger than the expected size that was determined to be available. In that case, a "FIFO full" condition can occur.

Another condition may occur if an EOF is lost: FC frame 210 could become larger than the maximum size FC frame. In that case, the "jumbo frame" bit will be set. However, the "FIFO full" bit does not necessarily need to be set for a "jumbo frame" event to occur, because the buffer may still have enough room to store a jumbo frame. According to some aspects of the invention, a jumbo frame will be terminated without waiting for an EOF of the FC frame 210 to be detected. The EOF type field will be marked with "jumbo frame type."

According to some aspects of the invention, the "no EOF type error" bit is set when a frame is ended with a control character inside an FC frame. According to some such aspects of the invention, the EOF type field will also indicate this condition, as described above.

Figure 8:
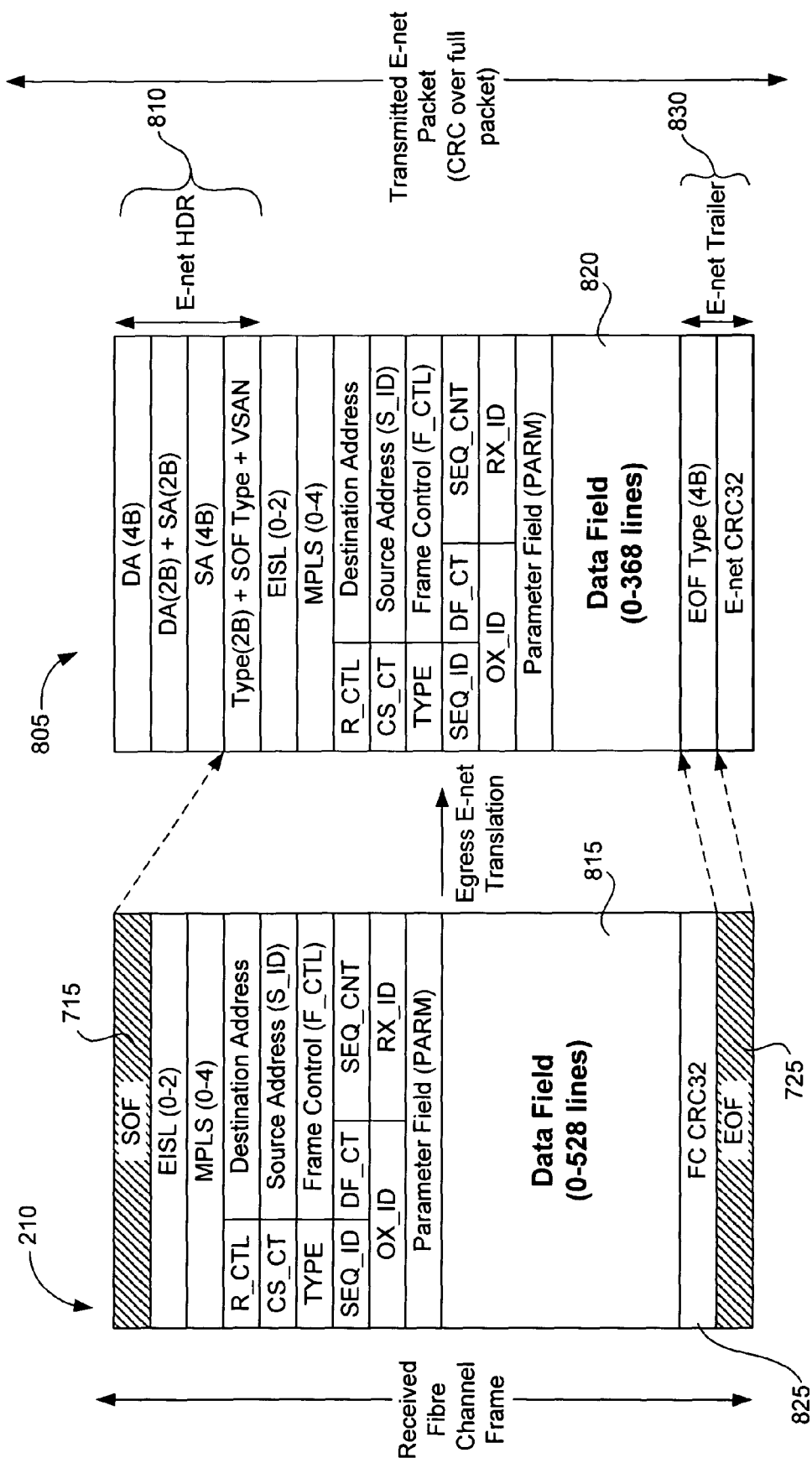
FIG. 8 depicts the input and output frames when a device is being used in "Ethernet truncate mode" according to some aspects of the invention.

FIG. 8 depicts the encapsulation of FC frames 210 when device 205 is operating in Ethernet truncate mode. The process uses FC frame 210 as input and outputs Ethernet frame 805, which is a species of Ethernet frame 215 depicted on FIG. 2. Header 810 of Ethernet frame 805 is similar to header 710, as described with reference to FIG. 7. Trailer 830 is also comparable to trailer 720.

The main distinction between ETM mode and NTM mode is that in ETM mode, payload 815 may be truncated, depending on its size. In ETM mode, device 205 will truncate a Fibre channel frame to have a maximum of 1496 bytes. A maximum Ethernet frame size is typically 1520 bytes, with a 24 byte overhead so the FC frame needs to be truncated at 1496 bytes. However, if the FC frame is exactly 1496 bytes, the frame will not be truncated. Instead, payload 815 and FC CRC field 825 will be encapsulated. However, if the FC frame is larger, the FC CRC field 825 will be omitted and the data field 815 may be truncated. Accordingly, data field 820 of Ethernet frame 805 has a maximum of 368 lines or 1472 bytes.

Figure 9:
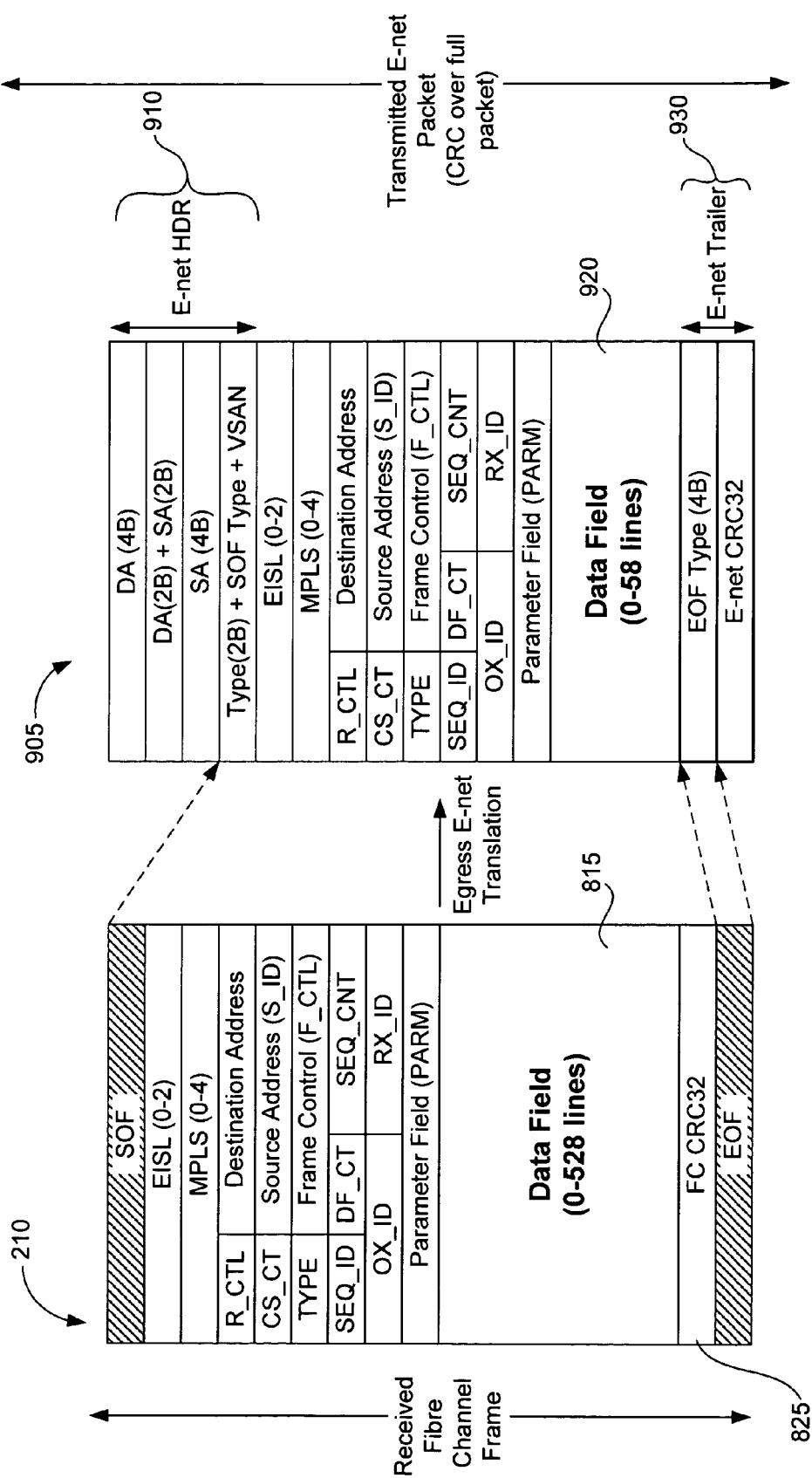
FIG. 9 depicts the input and output frames when a device is being used in "shallow truncate mode."

FIG. 9 depicts STM operation of device 205. In STM, the FC frame 210 is truncated if the size of the frame exceeds 256 bytes (64 lines). If FC data field 815 is 63 lines or less, then CRC field 825 will be included in outgoing Ethernet frame 905. Otherwise, CRC field will be truncated. Header 910 and trailer 930 are comparable to these of header 710 and trailer 730 described with reference to FIG. 7.

Figure 10:
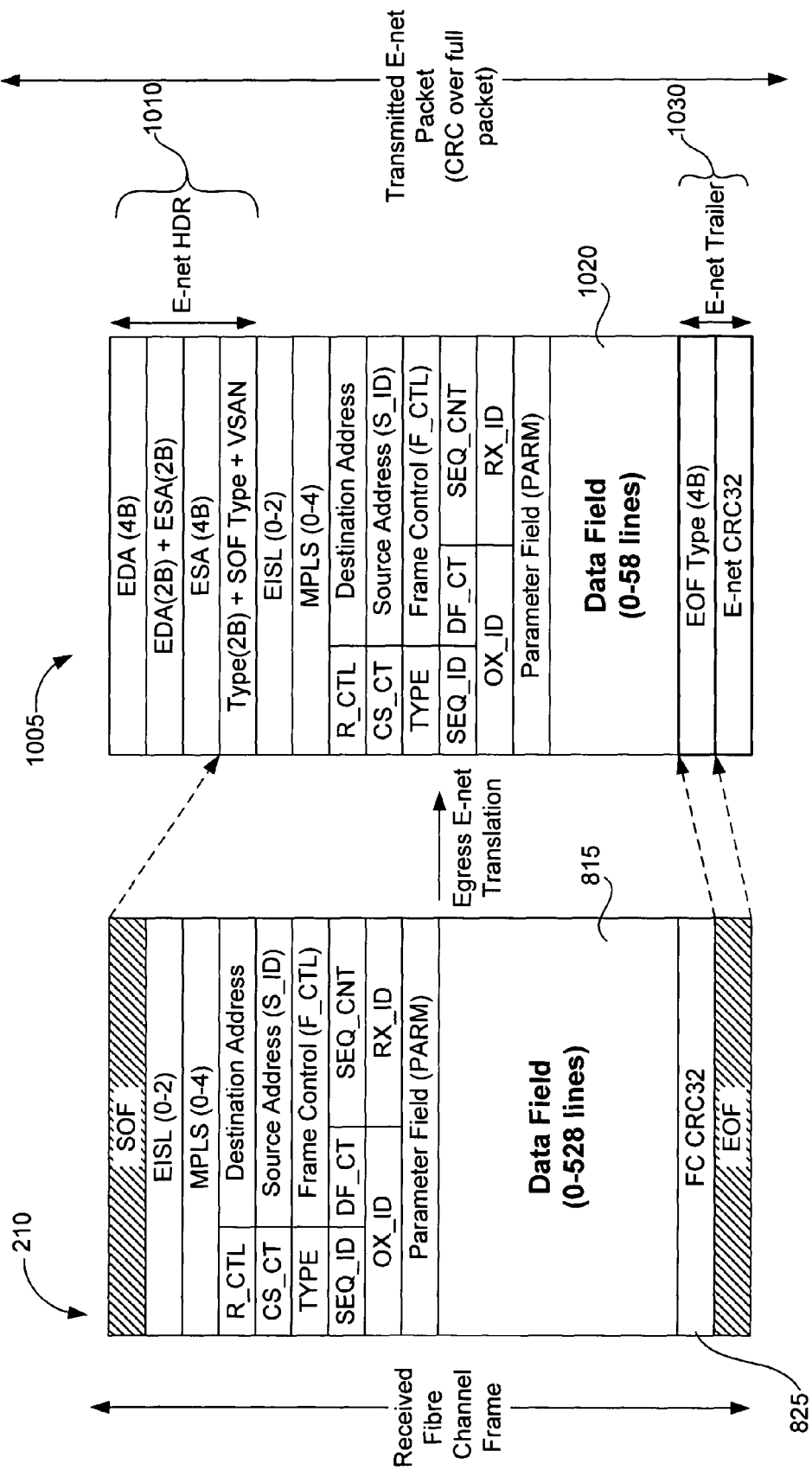
FIG. 10 depicts input and output frames for "deep truncate mode" operation.

FIG. 10 depicts a deep truncate mode of operation, according to some aspects of the invention. In deep truncate mode, the FC frame 210 is truncated if it exceeds 64 bytes. If data field 815 is 64 bytes or less, the CRC field 825 will be encapsulated and included in outgoing packet 1005. Header 1010 and trailer 1030 are comparable to those of header 710 and trailer 730, described above.

Figure 11:
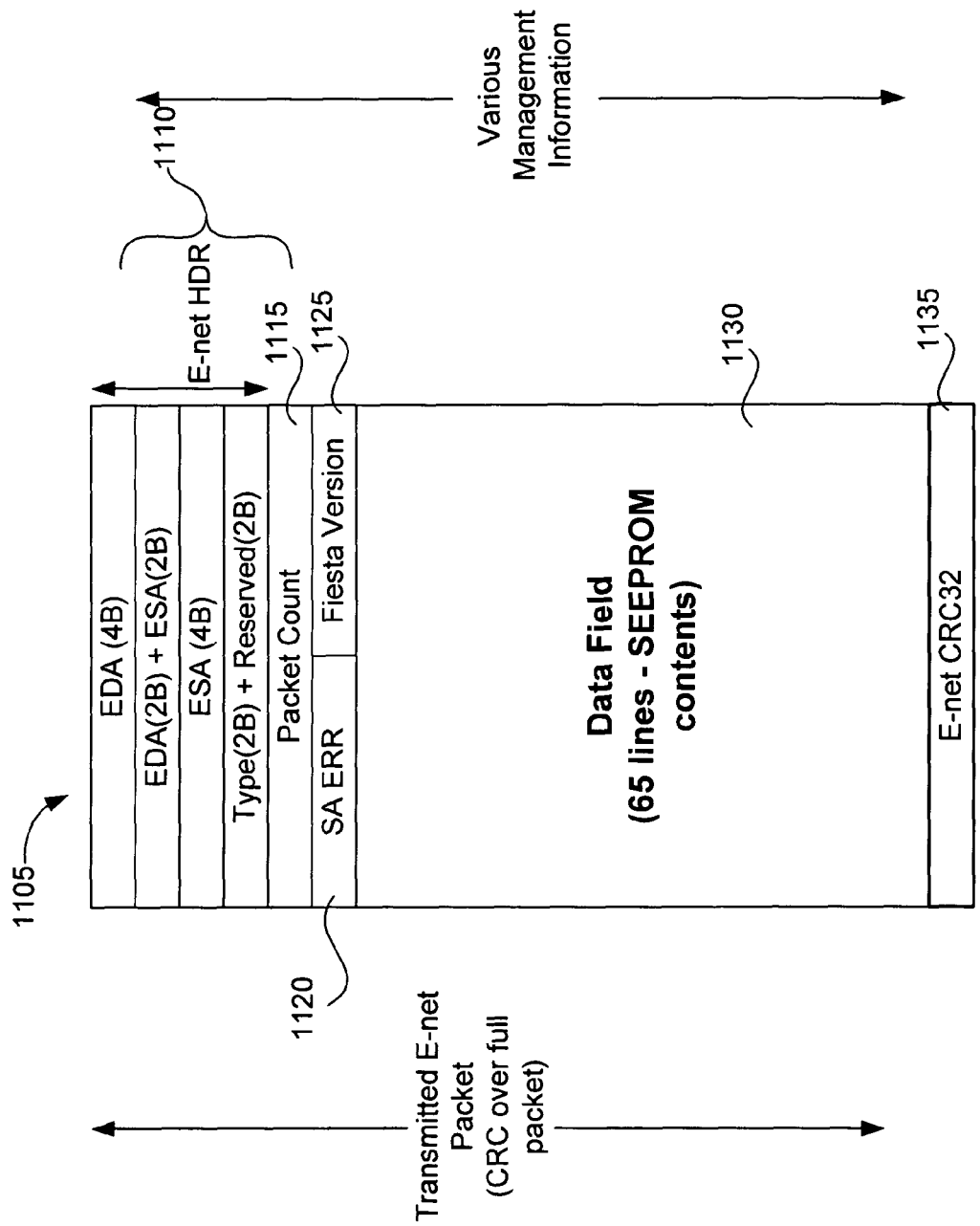
FIG. 11 depicts management packet format.

FIG. 11 depicts the format of packet 1105, which is generated by device when operating in "management mode" according to some aspects of the present invention. According to some aspects of management mode operation, device 205 transmits a fixed-size (e.g., 288 byte) Ethernet frame that contains debugging information relevant to device 205 for management. In preferred embodiments, when operating in management mode, device 205 will not accept FC frames 210. An internal packet generator block gathers relevant information from different modules of device 205 assembles the information into a packet and sends it out in a format such as that depicted in FIG. 11. One of skill in the art will appreciate that other formats of packet 1105 are within the scope of the present invention.

In this example, header 1110 includes destination and source address information as well as type information. The type information is obtained from IEEE and should be the same for all devices 205. Packet count field 1115 indicates the actual packet count number. According to some aspects of the invention, this number begins as soon as packets are sent in management mode. According to some aspects of the invention, the packet number may wrap after reaching a certain limit.

Field 1120 indicates whether there has been an error reading EEPROM 620. Field 1125 indicates the version number of device 205. According to some embodiments of the invention, field 1125 may indicate the version number of a particular component, such as FPGA 615.

Field 1130 is a data field. According to some aspects of the invention, field 1130 includes the contents of EEPROM 620. According to some such aspects of the invention, part of data field 1130 is reserved (e.g., the last 8 bytes).

Field 1135 is the computed cyclic redundancy code of the packet. In preferred embodiments, the CRC will be computed over the values contained in the fields of packet 1105.

Figure 12:
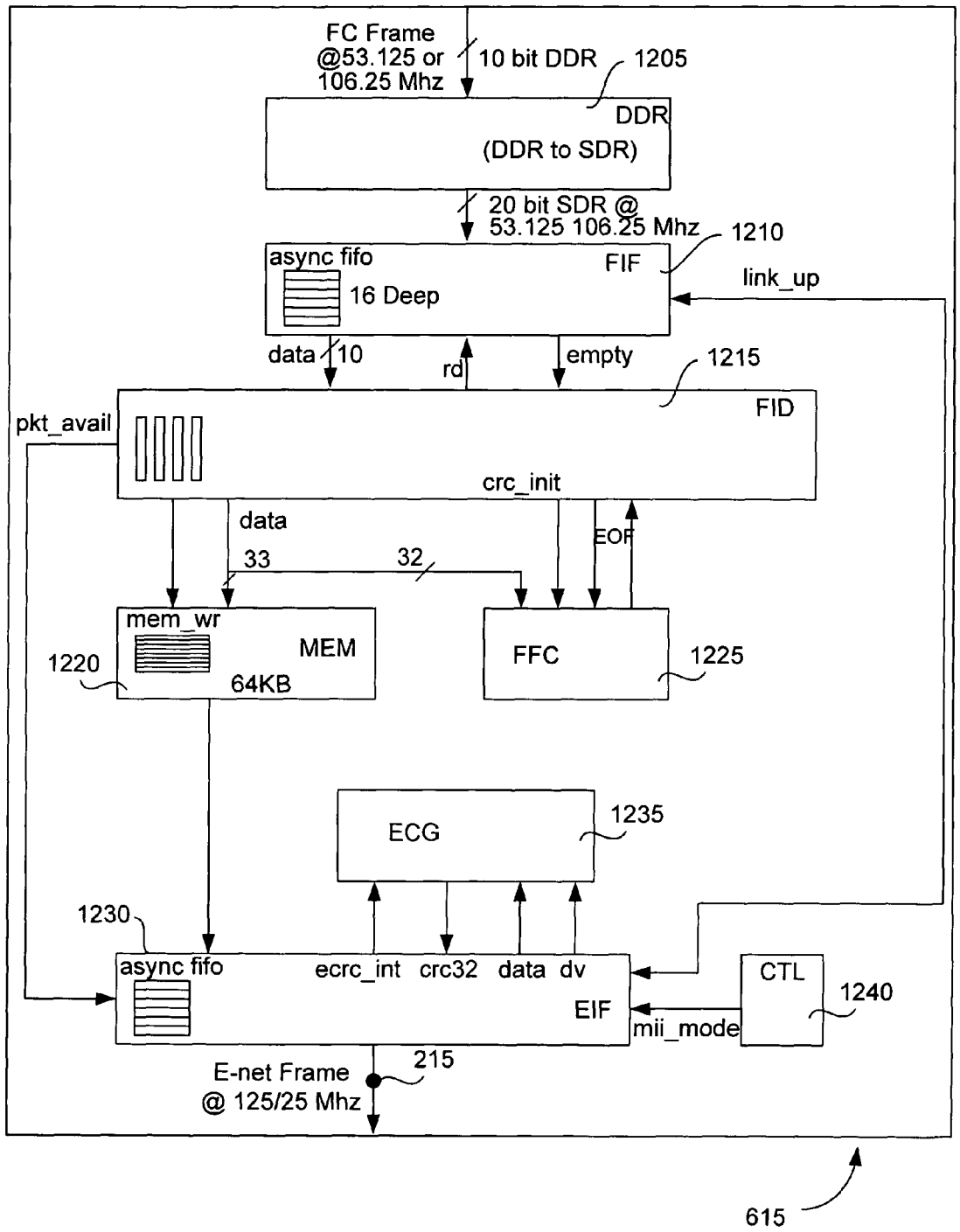
FIG. 12 is a block diagram that depicts the components of a processor used in some embodiments of the present invention.

FIG. 12 is a block diagram that depicts the components of processor 615 according to some embodiments of the invention. One of skill in the art will appreciate that in alternative embodiments the blocks illustrated in FIG. 12 can be merged or separated, eliminated, etc. The blocks shown in FIG. 12 define a particular architecture, which can change in other embodiments of the invention. If the architecture of processor 615 changes, the functionality of processor 615 may change or may remain the same.

Double data rate ("DDR") block 1205 is primarily responsible for converting double data rate data into single data rate data. For example, if the FC interface is running at 1 Gbps, the DDR data is input at 53.125 MHz in some embodiments of the invention. For an FC interface speed of 2 Gbps, the corresponding clock speed would be 106.25 MHz.

Fibre Channel interface ("FIF") block 1210 primarily performs a synchronization between the DDR clock, which runs at 53.125 or 106.25 MHz in some embodiments of the invention, and the core clock of FPGA (clock 660), which runs at 125 MHz in some embodiments of the invention. FIF block 1210 interfaces with DDR block 1205 and block 1215.

In some embodiments of the invention, as data arrive in FIF block 1210, they are put in an asynchronous buffer without any type of data checking or filtering. According to one embodiment of the invention, the buffer is a FIFO buffer that is 16 bits deep and 20 bits wide, capable of accepting 20 bits of data per clock. In embodiments wherein data in the FIFO are read at a faster rate than they are written, the "FIFO full" should not occur even if there are only 2 such buffers.

Block 1215 receives data from FIF block 1210. According to some aspects of the invention, block 1215 receives 10-bit data blocks from FIF block 1210. According to some embodiments, block 1215 operates at a 125 MHz clock and therefore reads data from FIF block 1210 at 125 MHz. Accordingly, block 1215 will read data from FIF block 1210 only when the buffer of block 1210 is not empty.

Block 1210 also checks whether the data are any of the SOF types. According to some aspects of the invention, if the received data are not one of the SOF types, block 1215 will take no action. However, if the received data are an SOF type, the SOF type will be decoded, as described generally above, and checked to see whether there is enough room in a buffer to store at least one Fibre Channel frame in the configured mode.

When device 205 operates in NTM mode according to some aspects of the invention, block 1215 checks whether there is room to store a maximum-sized frame. If there is no room in the buffer, the packet count will be incremented and the frame will be dropped. Block 1215 will then wait for the next frame.

Block 1215 may also check whether the next data include any of the EOF codes. The data are stored if all conditions are met. According to some aspects of the invention, when an EOF is received, block 1215 will notify FFC block 1225. When FFC block 1225 indicates the CRC status, FFC block 1225 will form an "EOF type" data block for the buffer and write the data into a memory block 1220. The CRC information of the received packet, whether good or bad, would be embedded into the "EOF type" field in such instances. These data would then be written into MEM block 1220.

Fibre Channel frame checker ("FFC") block 1225 is primarily responsible for checking the CRC of the received FC frame. These data are received from block 1215, for example on a 32-bit data interface. When the "EOF type" indication is received, FFC block 1225 generates a CRC error flag by comparing the CRC data of the frame (for example, of the previous 4 bytes) and the current CRC that was just calculated.

The function of FFC block 1225 is similar to that of ECG block 1235. However, the CRC calculations done or performed by these 2 blocks differ. The CRC performed by FFC block 1225 starts from the actual Fibre Channel frame, not including EDA, ESA and type fields of the Ethernet frame.

Block 1215 writes data into memory block 1220. EIF block 1230 reads data from memory block 1220.

Ethernet interface ("EIF") block 1230 is mainly responsible for reading packet data from memory block 1220 and outputting Ethernet frames 215. In preferred embodiments, EIF block 1230 performs an auto-negotiation with device 1220 to determine the speed of the physical link that needs to be established between device 205 and 220. According to some embodiments of the invention, EIF block 1230 will transmit packet data at 25 MHz or 125 MHz. In some embodiments of the invention, EIF block 1230 also calculates a CRC over the Ethernet frame received from memory block 1220 and appends the CRC information to the end of the frame that is sent to device 220.

SPAN and RSPAN

Because some embodiments of the present invention involve configuring an attached port for SPAN or RSPAN operation, this section sets forth some detail regarding these related technologies. The information set forth in the following paragraphs represents a "snapshot" of SPAN and RSPAN at the time the underlying technical documentation was drafted. As one of skill in the art will understand, the capabilities of SPAN and RSPAN continue to evolve. Accordingly, many of the express or implied limitations of SPAN and RSPAN operation will not apply in the future.

SPAN

SPAN (also referred to herein as "local SPAN") monitors network traffic though a Fibre Channel interface. Traffic through any Fibre Channel interface can be replicated to a special port called the SPAN destination port (SD port). Any Fibre Channel port in a switch can be configured as an SD port. Once an interface is in SD-port mode, it cannot be used for normal data traffic.

SD ports do not receive frames. Instead, they merely transmit a copy of the SPAN source traffic. The SPAN feature is non-intrusive and does not affect switching of network traffic for any SPAN source ports.

SPAN sources refer to the interfaces from which traffic can be monitored. You can also specify VSAN as a SPAN source, in which case all supported interfaces in the specified VSAN are included as SPAN sources. You can choose the SPAN traffic in the ingress direction, the egress direction, or both directions for any source interface.

Traffic entering the switch fabric through an ingress source interface is spanned or copied to the SD port. Similarly, traffic exiting the switch fabric through an egress source interface is spanned or copied to the SD port.

When a VSAN is specified as a source, then all physical ports and PortChannels in that VSAN are included as SPAN sources. A trunking E port ("TE port") is included only when the port VSAN of the TE port matches the source VSAN. A TE port is excluded even if the configured allowed VSAN list may have the source VSAN, but the port VSAN is different.

The following guidelines apply when configuring VSANs as a source. First of all, traffic on all interfaces included in a source VSAN is spanned only in the ingress direction. When a VSAN is specified as a source, one cannot perform interface-level configuration on the interfaces that are included in the VSAN. Previously-configured SPAN-specific interface information is discarded. If an interface in a VSAN is configured as a SPAN source, one cannot configure that VSAN as a source. Instead, one must first remove the existing SPAN configurations on such interfaces before configuring VSAN as a source. Interfaces are only included as sources when the port VSAN matches the source VSAN.

Each SPAN session represents an association of one destination with a set of source(s) along with various other specified parameters to monitor the network traffic. One destination can be used by one or more SPAN sessions. Presently, one can configure up to 16 SPAN sessions in a switch. Each session can have several source ports and one destination port. To activate a SPAN session, at least one source and the SD port must be up and functioning. Otherwise, traffic will not be directed to the SD port.

One can perform VSAN-based filtering to selectively monitor network traffic on specified VSANs. A VSAN filter can be applied to a selected source or to all sources in a session. Only traffic in the selected VSANs is spanned when you configure VSAN filters. At present, two types of VSAN filters can be specified, known as "interface level filters" and "session filters." Interface level VSAN filters can be applied for a specified TE port or trunking PortChannel to filter traffic in the ingress direction, the egress direction, or in both directions. A session filter filters all sources in the specified session. Session filters are bidirectional and apply to all sources configured in the session.

If no filters are specified, the traffic from all active VSANs for that interface is spanned. The effective filter on a port is the intersection (filters common to both) of interface filters and session filters. While any arbitrary VSAN filters can be specified in an interface, traffic can only be monitored on the port VSAN or on allowed-active VSANs in that interface. When a VSAN is configured as a source, that VSAN is implicitly applied as an interface filter to all sources included in the specified VSAN.

In some configurations, SPAN sends multiple copies of the same source traffic to the destination port. For example, in a configuration with a bidirectional SPAN session (both ingress and egress) for two SPAN sources, called s1 and s2, to a SPAN destination port, called d1, if a packet enters the switch through s1 and is sent for egress from the switch to s2, ingress SPAN at s1 sends a copy of the packet to SPAN destination d1 and egress SPAN at s2 sends a copy of the packet to SPAN destination d1. If the packet were Layer 2 switched from s1 to s2, both SPAN packets would be the same. If the packet were Layer 3 switched from s1 to s2, the Layer-3 rewrite would alter the source and destination Layer 2 addresses, in which case the SPAN packets would be different.

RSPAN

RSPAN is a method whereby a copy of the traffic being monitored is sent to a port on a remote switch instead of a port on a local switch. In order to transport a copy of the monitored traffic to the remote switch, the copied frames maybe encapsulated for transport through the network. The encapsulation may be of various types such as using a separate VSAN (or VLAN), using an FC encapsulation header or an IP/GRE encapsulation header or an MPLS encapsulation header. U.S. patent application Ser. No. 10/346,050, which describes enhanced RSPAN, is hereby incorporated in its entirety for all purposes.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein that are performed by FPGA 615 could be performed by one or more devices, e.g., by another type of microprocessor, by a cluster of microprocessors, etc. Moreover, it will be further appreciated that other embodiments of device 205 could accept input frames in formats other than that of FC protocol. Similarly, other embodiments of device 205 could output frames in a format other than that of Ethernet protocol. Moreover, other devices than those described above could perform the functions of device 220. For example, these functions could be performed by a device such as a workstation. Considering these and other variations, the scope of the invention should be determined with reference to the appended claims.

We claim:

1. A method of analyzing traffic on a network, comprising:
   receiving a first Fibre Channel frame from a first port of a network device;
   discarding a portion of a payload of the Fibre Channel frame to produce a truncated Fibre Channel frame that includes a truncated portion of the payload of the Fibre Channel frame, wherein discarding is performed according to a truncate mode specified in a control frame received prior to the first Fibre Channel frame, wherein the truncate mode indicates an amount that Fibre Channel frames that are received subsequent to the control frame are to be truncated;
   encapsulating the truncated Fibre Channel frame as an Ethernet frame without replacing the truncated portion of the payload of the Fibre Channel frame with another value; and
   outputting the Ethernet frame to an analyzing device, wherein the discarded portion of the payload of the Fibre Channel frame is not encapsulated in the Ethernet frame or otherwise output to the analyzing device;
   wherein the control frame is not output to the analyzing device.

2. The method of claim 1, further comprising the step of configuring the first port for switched port analyzer mode, wherein the first port outputs Fibre Channel frames replicating traffic of at least a second port of the network device.

3. The method of claim 1, wherein the encapsulating step comprises encapsulating an entire Fibre Channel frame.

4. A method of analyzing traffic on a network, comprising:
   receiving a first Fibre Channel frame by a network device;
   determining that the first Fibre Channel frame is a control frame;
   when it is determined that the first Fibre Channel frame is a control frame, the first Fibre Channel frame will not be sent to an analyzing device;
   receiving a second Fibre Channel frame from a first port of the network device;
   discarding a portion of a payload of the second Fibre Channel frame to produce a truncated Fibre Channel frame according to a truncate mode specified in the control frame;
   encapsulating the truncated Fibre Channel frame as an Ethernet frame; and
   outputting the Ethernet frame to the analyzing device, wherein the discarded portion of the payload of the second Fibre Channel frame is not encapsulated in the Ethernet frame or otherwise output to the analyzing device.

5. The method of claim 1, further comprising the step of converting the Fibre Channel frame from a light signal to an electrical signal.

6. The method of claim 1, further comprising the step of regulating a speed at which the Fibre Channel frame is input.

7. The method of claim 1, further comprising the step of regulating a speed at which the Ethernet frame is output.

8. A method of analyzing network traffic, comprising:
   receiving Fibre Channel frames from a first port of a network device, the Fibre Channel frames including traffic from at least one other port of the network device, wherein the first port is configured to replicate traffic of the at least one other port of the network device;
   discarding a portion of a payload of at least one of the Fibre Channel frames to produce a truncated Fibre Channel frame that includes a truncated portion of the payload of the Fibre Channel frame, wherein discarding is performed according to a truncate mode specified in a control frame received prior to the at least one of the Fibre Channel frames, wherein the truncate mode indicates an amount that Fibre Channel frames that are received subsequent to the control frame are to be truncated;
   encapsulating the truncated Fibre Channel frame as an Ethernet frame without replacing the truncated portion of the payload of the Fibre Channel frame with another value; and
   outputting the Ethernet frame to an analyzing device;
   wherein the control frame is not output to the analyzing device.

9. The method of claim 8, further comprising:
   determining that a second set of one or more Fibre Channel frames are control frames; and
   determining that the second set of one or more Fibre Channel frames will not be sent to the analyzing device.

10. The method of claim 8, wherein the encapsulating step comprises encapsulating only a portion of a Fibre Channel frame.

11. The method of claim 8, further comprising the step of adding data to a Fibre Channel frame.

12. The method of claim 8, further comprising the step of converting a Fibre Channel frame from a light signal to an electrical signal.

13. The method of claim 8, further comprising the step of regulating a speed at which the Fibre Channel frames are input.

14. The method of claim 8, further comprising the step of regulating a speed at which the Ethernet frames are output.

15. An apparatus for facilitating the analysis of network traffic, the apparatus comprising:
   a first port for receiving a Fibre Channel frame from a first network device;
   at least one processor and a memory configured to do the following:
      discard a portion of a payload of a Fibre Channel frame to produce a truncated Fibre Channel frame that includes a truncated portion of the payload of the Fibre Channel frame; and encapsulate the truncated Fibre Channel frame as an Ethernet frame without replacing the truncated portion of the payload of the Fibre Channel frame with another value; and a second port for outputting the Ethernet frame to an analyzing device, wherein the discarded portion of the payload of the Fibre Channel frame is not encapsulated in the Ethernet frame or otherwise output to the analyzing device;

wherein the apparatus is configurable according to a control frame received by the apparatus prior to the Fibre Channel frame, wherein a truncate mode of the control frame indicates an amount of the Fibre Channel frame that is to be discarded.

16. The apparatus of claim 15, wherein the at least one processor encapsulates an entire Fibre Channel frame.

17. The apparatus of claim 15, further comprising a converter for converting the Fibre Channel frame from a light signal to an electrical signal.

18. The apparatus of claim 15, further comprising a regulator for regulating a speed at which the Fibre Channel frame is input.

19. The apparatus of claim 15, further comprising a regulator for regulating a speed at which the Ethernet frame is output.

20. The apparatus of claim 15, further comprising a third port for receiving Fibre Channel frames from a second network device, wherein at least one processor encapsulates the Fibre Channel frames from the first port and the third port as Ethernet frames.

21. The apparatus of claim 19, wherein a processor determines the speed at which the Ethernet frame is output to another device.

22. The apparatus of claim 15, wherein the control frame is a Fibre Channel frame received from the network device via the first port.

23. The apparatus of claim 15, wherein the control frame is an Ethernet frame received via the second port.

24. The apparatus of claim 15, wherein the control frame contains an Internet Protocol address so that a subsequently-received frame can be routed to the Internet.

25. The apparatus of claim 15, wherein the control frame contains frame filtering information indicating that the apparatus should drop frames coming from one or more source addresses.

26. The apparatus of claim 15, wherein the control frame contains port filtering information, which controls the apparatus to filter out frames based on their associated ports.

27. The apparatus of claim 15, wherein the control frame contains a destination address for the apparatus to include in subsequently transmitted packets.

28. The apparatus of claim 15, wherein the control frame contains truncate mode information that controls the apparatus to truncate incoming Fibre Channel packets according to a predefined truncate mode.

29. The apparatus of claim 15, wherein the control frame contains information that controls the apparatus to stop outputting Ethernet frames.

30. The apparatus of claim 15, wherein the control frame contains information that controls the apparatus to start outputting Ethernet frames.

31. The apparatus of claim 15, wherein the control frame contains information that controls the apparatus to generate a Hello packet and send the Hello packet from the second port to inform an external device that the apparatus is functioning.

32. An apparatus for facilitating the analysis of network traffic, comprising:

means for receiving a Fibre Channel frame from a first port of a network device;

means for discarding a portion of a payload of the Fibre Channel frame to produce a truncated Fibre Channel frame that includes a truncated portion of the payload of the Fibre Channel frame, wherein discarding is performed according to a truncate mode specified in a control frame received prior to the Fibre Channel frame, wherein the truncate mode indicates an amount that Fibre Channel frames that are received subsequent to the control frame are to be truncated;

means for encapsulating the truncated Fibre Channel frame as an Ethernet frame without replacing the truncated portion of the payload of the Fibre Channel frame with another value; and means for outputting the Ethernet frame to an analyzing device, wherein the discarded portion of the payload of the Fibre Channel frame is not encapsulated in the Ethernet frame or otherwise output to the analyzing device;

wherein the control frame is not output to the analyzing device.

33. A non-transitory computer readable storage medium storing thereon computer-readable instructions that when executed cause an apparatus to perform the following steps:

receiving a Fibre Channel frame from a first port of a network device;

discarding a portion of a payload of the Fibre Channel frame to produce a truncated Fibre Channel frame that includes a truncated portion of the payload of the Fibre Channel frame, wherein discarding is performed according to a truncate mode specified in a control frame received prior to the Fibre Channel frame, wherein the truncate mode indicates an amount that Fibre Channel frames that are received subsequent to the control frame are to be truncated;

encapsulating the truncated Fibre Channel frame as an Ethernet frame without replacing the truncated portion of the payload of the Fibre Channel frame with another value; and outputting the Ethernet frame to an analyzing device, wherein the discarded portion of the payload of the Fibre Channel frame is not encapsulated in the Ethernet frame or otherwise output to the analyzing device;

wherein the control frame is not output to the analyzing device.

34. The method of claim 8, wherein the network device is configured for remote switched port analyzer ("RSPAN") operation.

35. The method of claim 4, wherein the control frame indicates that the first Fibre Channel frame is to be truncated, wherein the second Fibre Channel frame is received prior to the first Fibre Channel frame.

36. The method of claim 4, wherein the control frame identifies a truncate mode indicating an amount that Fibre Channel frames that are received subsequent to the second Fibre Channel frame are to be truncated.

37. The method of claim 36, wherein the truncate mode is deep truncate mode.

38. The method of claim 36, wherein the truncate mode is shallow truncate mode.

39. The method of claim 36, wherein the truncate mode is Ethernet truncate mode.

40. The method of claim 4, wherein control frame identifies a non-truncate mode indicating that Fibre Channel frames that are received subsequent to the second Fibre Channel frame are not to be truncated.

41. The method of claim 9, wherein the control frames indicate an amount that the first plurality of Fibre Channel frames are to be truncated prior to being encapsulated as Ethernet frames.

42. The apparatus of claim 15, wherein the control frame regulates a speed at which the Fibre Channel frame is input.

43. The apparatus of claim 15, wherein the control frame regulates a speed at which the Ethernet frame is output.

44. The apparatus of claim 15, the at least one processor and the memory being further configured for:
    receiving a second Fibre Channel frame, wherein the second Fibre Channel frame is received prior to the first Fibre Channel frame;
    determining that the second Fibre Channel frame is a control frame; and
    determining that the second Fibre Channel frame will not be sent to the analyzing device;
    wherein the control frame indicates that the first Fibre Channel frame is to be truncated.

45. The apparatus of claim 15, the at least one processor and the memory being further configured for:
    receiving a second Fibre Channel frame;
    determining that the second Fibre Channel frame is a control frame; and
    determining that the second Fibre Channel frame will not be sent to the analyzing device;
    wherein the control frame identifies a truncate mode indicating an amount that Fibre Channel frames that are received subsequent to the second Fibre Channel frame are to be truncated.

46. The apparatus of claim 45, wherein the truncate mode is deep truncate mode.

47. The apparatus of claim 45, wherein the truncate mode is shallow truncate mode.

48. The apparatus of claim 45, wherein the truncate mode is Ethernet truncate mode.

49. The apparatus of claim 15, the at least one processor and the memory being further configured for:
    receiving a second Fibre Channel frame;
    determining that the second Fibre Channel frame is a control frame; and
    determining that the second Fibre Channel frame will not be sent to the analyzing device;
    wherein the control frame identifies a non-truncate mode indicating that Fibre Channel frames that are received subsequent to the second Fibre Channel frame are not to be truncated.

50. The apparatus of claim 45, wherein the control frame indicates an amount that Fibre Channel frames are to be truncated prior to being encapsulated as Ethernet frames.

51. The non-transitory computer-readable storage medium of claim 33, wherein the computer-readable instructions, when executed, cause the apparatus to perform the following further steps:
    receiving a second Fibre Channel frame, wherein the second Fibre Channel frame is received prior to the first Fibre Channel frame;
    determining that the second Fibre Channel frame is a control frame; and
    determining that the second Fibre Channel frame will not be sent to the analyzing device;
    wherein the control frame indicates that the first Fibre Channel frame is to be truncated.

52. The non-transitory computer-readable storage medium of claim 33, wherein the computer-readable instructions, when executed, cause the apparatus to perform the following further steps:
    receiving a second Fibre Channel frame;
    determining that the second Fibre Channel frame is a control frame; and
    determining that the second Fibre Channel frame will not be sent to the analyzing device;
    wherein the control frame identifies a truncate mode indicating an amount that Fibre Channel frames received subsequent to the first Fibre Channel frame are to be truncated.

53. The non-transitory computer-readable storage medium of claim 52, wherein the truncate mode is deep truncate mode.

54. The non-transitory computer-readable storage medium of claim 52, wherein the truncate mode is shallow truncate mode.

55. The non-transitory computer-readable storage medium of claim 52, wherein the truncate mode is Ethernet truncate mode.

56. The non-transitory computer-readable storage medium of claim 33, wherein the computer-readable instructions, when executed, cause the apparatus to perform the following further steps:
    receiving a second Fibre Channel frame;
    determining that the second Fibre Channel frame is a control frame; and
    determining that the second Fibre Channel frame will not be sent to the analyzing device;
    wherein control frame identifies a non-truncate mode indicating that Fibre Channel frames that are received subsequent to the second Fibre Channel frame are not to be truncated.

57. The non-transitory computer-readable storage medium of claim 52, wherein the control frame indicates an amount that Fibre Channel frames received subsequent to the second Fibre Channel frame are to be truncated prior to being encapsulated as Ethernet frames.

* * * * *